United States Patent
Yuan et al.

(10) Patent No.: US 11,939,858 B2
(45) Date of Patent: Mar. 26, 2024

(54) IDENTIFICATION OF WELLBORE DEFECTS USING MACHINE LEARNING SYSTEMS

(71) Applicant: Baker Hughes Oilfield Operations LLC, Houston, TX (US)

(72) Inventors: Peng Yuan, Houston, TX (US); Jaehyuk Lee, Houston, TX (US); Feyzi Inanc, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 495 days.

(21) Appl. No.: 17/116,603

(22) Filed: Dec. 9, 2020

(65) Prior Publication Data

US 2022/0178242 A1     Jun. 9, 2022

(51) Int. Cl.
*E21B 47/005* (2012.01)
*G06N 20/00* (2019.01)

(52) U.S. Cl.
CPC ........... *E21B 47/005* (2020.05); *G06N 20/00* (2019.01); *E21B 2200/20* (2020.05); *E21B 2200/22* (2020.05)

(58) Field of Classification Search
CPC ............... E21B 47/005; E21B 2200/20; E21B 2200/22; G06N 20/00
See application file for complete search history.

(56) References Cited

U.S. PATENT DOCUMENTS

| | | | |
|---|---|---|---|
| 2003/0110147 A1* | 6/2003 | Li | G06F 18/214 706/1 |
| 2014/0110124 A1 | 4/2014 | Goldner | |
| 2018/0010443 A1* | 1/2018 | Lu | E21B 47/107 |
| 2018/0149019 A1* | 5/2018 | Bose | E21B 47/005 |
| 2019/0087939 A1 | 3/2019 | Hakimuddin | |
| 2020/0117580 A1* | 4/2020 | Lekivetz | G06F 11/368 |
| 2020/0174149 A1* | 6/2020 | Thiruvenkatanathan | G01V 1/307 |

FOREIGN PATENT DOCUMENTS

| | | |
|---|---|---|
| CN | 104121014 | 10/2014 |
| CN | 114154539 A * | 3/2022 |

OTHER PUBLICATIONS

International Search Report and Written Opinion dated Feb. 17, 2022 in corresponding PCT Application No. PCT/US21/61992.

* cited by examiner

*Primary Examiner* — Regis J Betsch
(74) *Attorney, Agent, or Firm* — Hogan Lovells US LLP

(57) ABSTRACT

A method for identifying defects in a multi-barrier wellbore includes receiving log data, the log data corresponding to one or more wellbore operations, the log data including data from at least one measurement modality corresponding to a present measurement modality. The method also includes training, using the log data, a machine learning model. The method further includes acquiring wellbore data, via the present measurement modality, during a logging operation. The method also includes processing at least a portion of the wellbore data using the trained machine learning model. The method includes identifying one or more features of interest in the wellbore data, via the trained machine learning model.

20 Claims, 7 Drawing Sheets

IDENTIFICATION OF WELLBORE DEFECTS USING MACHINE LEARNING SYSTEMS

BACKGROUND

1. Field of the Disclosure

The present disclosure relates to systems and methods for downhole measurements, and in particular, to identification of wellbore defects using machine learning systems.

2. Description of Related Art

Evaluations for wellbore defects, such as cement evaluation, are often performed in wellbores with single tubulars (e.g., casing). However, information acquired using nuclear measurement modalities may not produce signals with sufficient strength to perform evaluations in multi-barrier wells, such as plug and abandonment wells. As a result, expensive and complex evaluation methods are often deployed.

SUMMARY

Applicant recognized the limitations with existing systems herein and conceived and developed embodiments of systems and methods, according to the present disclosure, for pattern recognition techniques using nuclear measurements.

In an embodiment, a method for detecting a wellbore defect includes receiving, at a trained machine learning system, input data, the input data corresponding to log data for a wellbore operation in a multi-barrier wellbore. The method also includes processing, using a first classifier of the machine learning system, the input data. The method further includes identifying, using the first classifier of the machine learning system, a feature of interest associated with the input data. The method also includes receiving, at a second classifier of the machine learning system, first output data from the first classifier and the input data, the first output data corresponding to a defect associated with the wellbore. The method further includes receiving, at a third classifier of the machine learning system, second output data from the second classifier and the input data, the second output data corresponding to a first property of the defect. The method also includes providing a report corresponding to the defect, the first property of the defect, and a second property of the defect corresponding to the third output data.

In an embodiment, a method for identifying defects in a multi-barrier wellbore includes receiving log data, the log data corresponding to one or more wellbore operations, the log data including data from at least one measurement modality corresponding to a present measurement modality. The method also includes training, using the log data, a machine learning model. The method further includes acquiring wellbore data, via the present measurement modality, during a logging operation. The method also includes processing at least a portion of the wellbore data using the trained machine learning model. The method includes identifying one or more features of interest in the wellbore data, via the trained machine learning model.

In an embodiment, a method for identifying defects in a wellbore includes receiving log data, the log data corresponding to one or more wellbore operations. The method also includes training, using the log data, a machine learning model. The method further includes acquiring wellbore data, during a logging operation. The method also includes normalizing at least a portion of the wellbore data, the normalized portion of the wellbore data corresponding to a location of interest. The method includes processing the normalized portion of wellbore data using the trained machine learning model. The method also includes determining, via a first classifier of the machine learning model, whether a feature of interest is present in the normalized portion of the wellbore data. The method further includes upon determining the feature of interest is not present, ending processing of the normalized portion of the wellbore data. The method includes upon determining the feature of interest is present, determining one or more properties of the feature of interest using at least one additional classifier.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
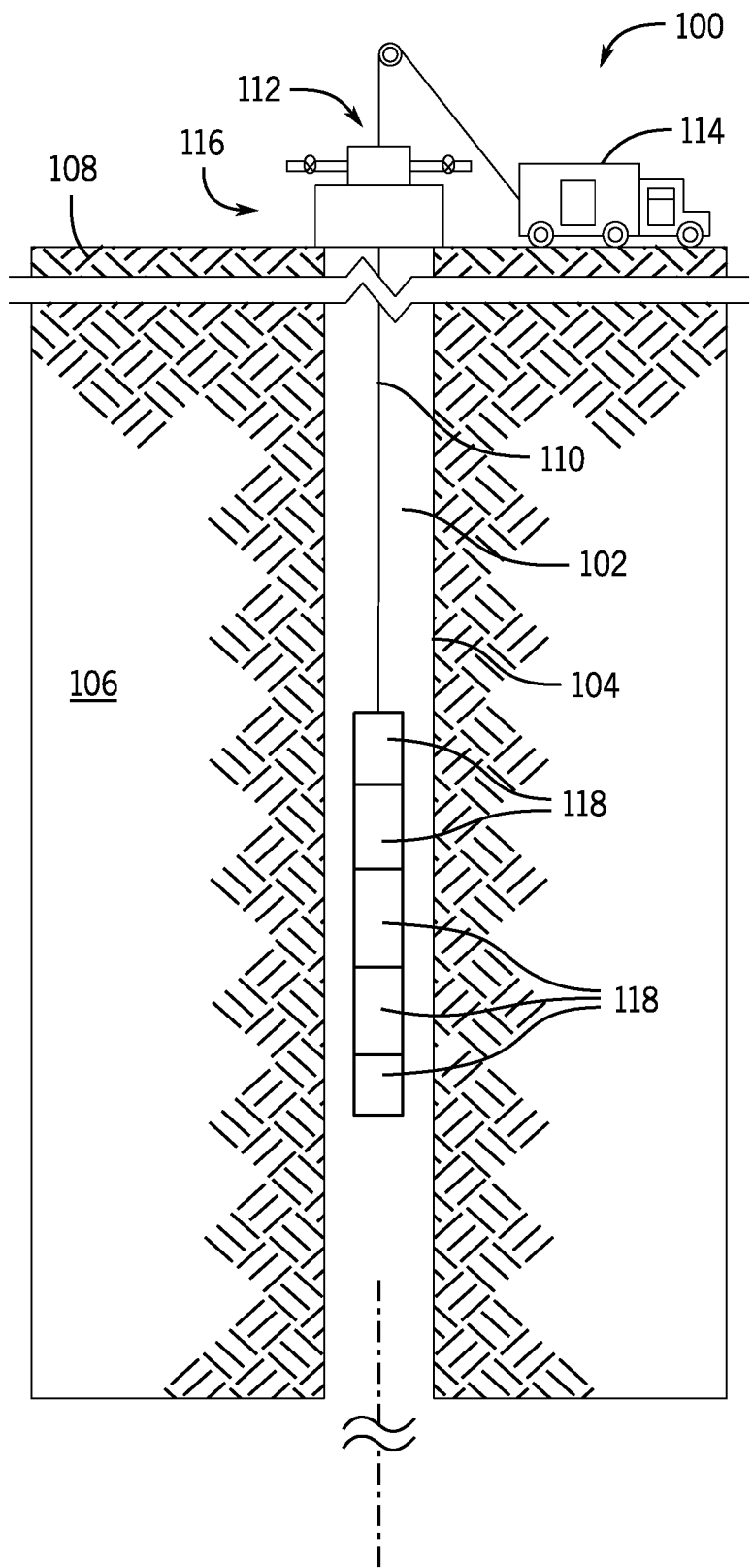
FIG. 1 is a cross-sectional side view of an embodiment of a wellbore system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure use machine learning to identify wellbore defects, cement defect size, cement defect location, and tubing eccentricity for multiple casing wells using data from nuclear measurements. Using nuclear measurement, there will be a large number of weak signals. However, at least a portion of each of these signals may include some useful information about a flaw and/or the formation. Embodiments of the present disclosure may be used to identify relationships between target variables (i.e. flaw size, orientation, and tubing eccentricity) and input variables/signals. Accordingly, the information may be aggregated and analyzed using a machine learning system to identify defects, identify information about the defects, or to identify formation properties.

To date, accurate cement evaluation has been limited to evaluation behind a single tubular, i.e. through casing alone. Although this method works well in new completions, it has several limitations in the case of plug and abandonment (P&A) wells, often demanding expensive operations to be performed so that this evaluation can be made, especially in offshore wells requiring a rig. To evaluate cement bonding quality through multiple casing strings, nuclear measurement will be used in combination of other measurements (auxiliary measurements/curves).

A downhole nuclear logging tool includes a radiation generation source operable to emit neutron radiation into a formation surrounding the tool and a radiation detector fixed relative to the radiation generation source and operable to detect backscattered radiation from the formation surrounding the tool. To get the azimuthal resolution from the measuring quantity, multiple neutron radiation detectors (e.g., a detector cluster) placed around circumferential direction maybe used. Furthermore, to have different depth of investigation, detector clusters may be placed at different distances from the radiation generation source. Finally, when measuring the radiation at a single detector, multiple measurements at different time windows may be used. In short, for evaluating cement bonding quality using nuclear measurements, many measurements will be collected from different detector clusters, different detectors, and/or different time windows. However, because of attenuation from multiple tubing and cement layers, these measurement signals will often be quite weak. These nuclear measurements together with other measurements, such as auxiliary curves, will carry the information about formation lithology, formation porosity, etc., as well as information about cement flaw size, flaw orientation, and tubing eccentricity, among other features.

Embodiments of the present disclosure may utilize a subset of artificial intelligence (AI) known as machine learning. A machine learning model has the ability to automatically learn (or learn under supervision) and improve from experience without using explicit instructions. Systems and methods may develop a trained machine learning model to identify relationships between inputs (e.g., multiple weak signals) and target variables and then deploy that trained model to evaluate downhole logs.

In various embodiments, the machine learning systems may include a signal processing step adapted to pre-process the signal for use with the model. The data pre-processing includes data filtering together with data cleaning, diagnosing, and outlier identification, missing data handling, and the like.

Additionally, the machine learning system may include a normalization step. Normalization obtains a relative change about base case(s), such as a typically no defect case. The normalization may be done for each individual signal as well to normalize the contribution from each signal. Some tree based machine learning algorithm may not require data to be normalized, however, embodiments may be utilized with various different machine learning algorithms, and as a result, may normalize data for use with one or more algorithms in parallel.

Additionally, the machine learning system may include a feature engineering step. The additional features (e.g., additional signals) can be added or generated by using other features such as addition, subtraction, multiplication, etc. Feature engineering enables the algorithm to discover and utilize complex relationship between input variable(s) and target variable(s) for the algorithm itself. These additional features can include, for example, the summation of all detector responses from a cluster, ratios between different detector responses at same or different detector clusters, and the like.

Additionally, the machine learning system may include a training step. For example, a machine learning system may include supervised or unsupervised learning where input data (e.g., ground truth data) is associated with known target variable values to train the machine learning model. For example, training data may include logs of nuclear measurement data together with known cement flaw size, orientation, tubing eccentricity, etc. as well as formation properties (e.g., lithology, porosity) and other impacting parameters (e.g., borehole fluid type) to train a machine learning model, such as a random forest machine learning model, a convolutional neural network, a recurrent neural network, or other machine learning system. To improve the prediction accuracy, large and diverse training data sets may be used.

Moreover, the machine learning system may include a validation step. The trained machine learning model may be validated for its accuracy on one or more data sets, which also include ground truth data and have not been used to train the model. K-fold cross validation may also be utilized where an amount of validation data is insufficient. In various embodiments, a confusion matrix or other specific values can be used as validation metrics.

Additionally, the machine learning system may be deployable as a trained machine learning system to process the nuclear measurements (together with other auxiliary measurements in various embodiments) to obtain information about cement flaw size, orientation, tubing eccentricity, and the like.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, such as an imaging tool, a resistivity tool, a nuclear magnetic resonance tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may relate to a nuclear detection tool that may include one or more radiation sources and detectors to receive signals corresponding to radiation emitted from the formation. The radiation may be naturally occurring or in response to interrogation from the source. The tools associated with these segments 118 may be utilized to determine one or more properties of the formation 106 and/or identify specific features of the wellbore, such as properties of the tubing and/or casing.

In the illustrated embodiment, the tool 102 is deployed on the wireline 110 and may be transitioned through the wellbore 104 via gravity. While the illustrated wellbore 104 is shown as being substantially straight (e.g., straight up and down) it should be appreciated that wellbores may be deviated or have geometric differences along their length. Furthermore, the illustrated wellbore 104 does not include a casing, cement securing the casing to the formation 106, or a multi-barrier structure, as may be present in wellbores, such as subsea wellbores and/or older wellbores undergoing plugging and abandonment. In various embodiments, defects may form in the layers of casing and/or in the cement, such as thinning, holes, or the like. Accordingly, embodiments of the present disclosure may be directed toward utilizing tools 102 to identify those defects.

Figure 2:
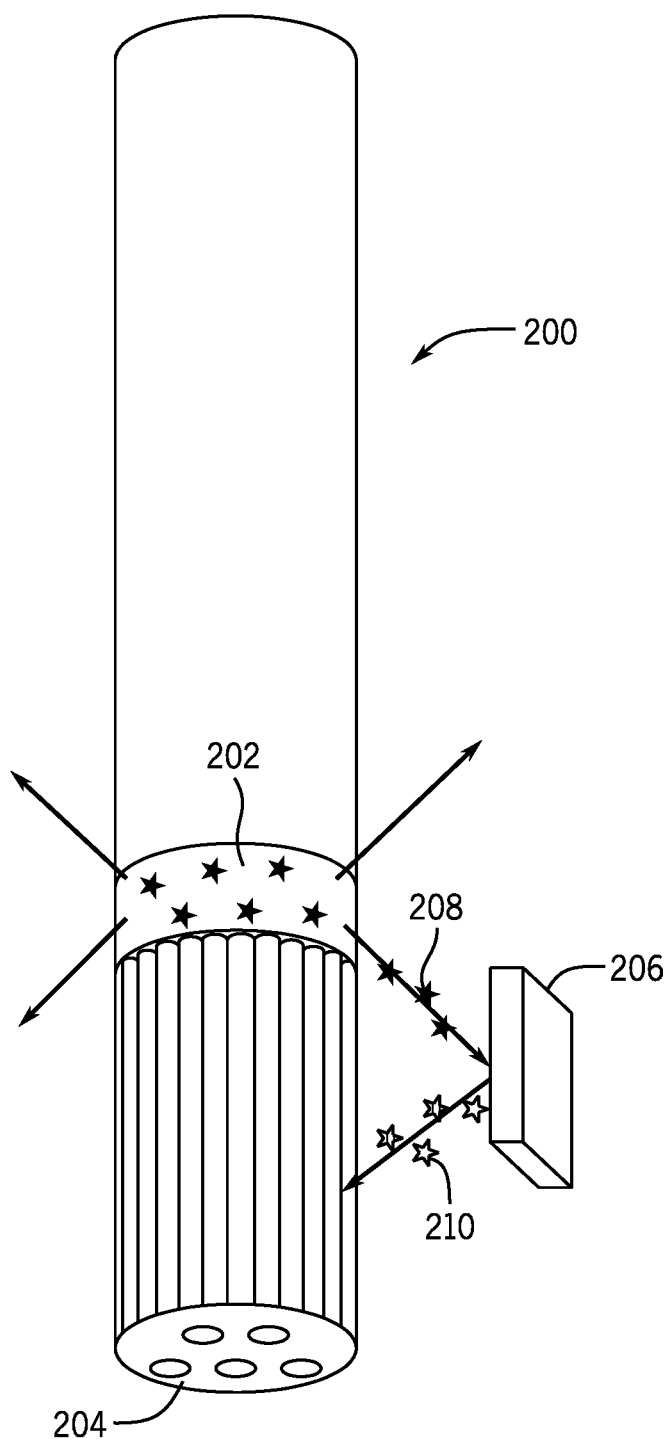
FIG. 2 is a perspective view of an embodiment of a nuclear logging operation, in accordance with embodiments of the present disclosure.

FIG. 2 is a schematic perspective view of an embodiment of a nuclear measurement device 200, which may be a tool forming one or more segments 118 (FIG. 1). The illustrated nuclear measurement device 200 includes a neutron generation unit 202, such as an electric neutron generation unit or a chemical neutron generation unit, and a detection unit 204, which in various embodiments, may be configured to detect various types of radiation, such as gamma rays, x-rays, neutrons, or the like. In various embodiments, the nuclear generation unit 202 is a pulsed neutron generator that emits neutrons for a period of time and then stops emitting neutrons for a second period of time. In the illustrated embodiment, the detection unit 204 is fixed relative to the neutron generation unit 202. That is, movement of the neutron generation unit 202 will also be associated with equal movement of the detection unit 204. In various embodiments, the generation unit 202 includes one or more neutron generators to produce neutrons at an energy of approximately 14.1 MeV, which may be termed "fast" neutrons.

In embodiments, the neutron generation unit 202 is a pulsed generator that emits a neutron beam for a period of time, ceases to emit the neutron flux for a period of time, and then emits the neutron flux for a second period of time. For example, the high-energy radiation may be emitted from the generation unit 202 toward a target 206, such as a portion of the casing, portion of the cement wall, portion of the formation 106, or any other reasonable downhole feature. The radiation may be emitted for periods of time to enable accumulation of certain types of radiation. For example, as fast neutrons undergo elastic scattering, energy is lost and the neutrons may become thermal neutrons (e.g., neutrons with energy less than 0.8 eV), which may be captured. Neutron capture reactions are accompanied by the emission of capture gamma rays. In various embodiments, the fast neutrons may interact with other nuclei in the formation, leading to inelastic scattering, which may be associated with emission of inelastic gamma rays. Additionally, (n,p) and (n,γ) reactions by the neutrons in the formation 106 may result in unstable nuclei that may decay with emission of activation gamma rays. In embodiments, the detection unit 204 may detect the gamma rays, neutrons, or the like.

In the illustrated embodiment, a neutron flux 208 may be transmitted radially outward from the generation unit 202. It should be appreciated that, initially, the neutron flux 208 may be mostly high energy, fast neutrons that will interact and thermalize over time. However, some of the fast neutrons may thermalize very quickly, and as a result, the neutron flux 208 may include a combination of both fast and thermal neutrons.

In various embodiments, the neutron flux 208 is a circumferential flux moving radially outward from the generation unit 202. However, in various embodiments, the neutron flux 208 may be directed or otherwise targeted toward a particular location. The target 206 may include a casing, part of the formation, cement, or the like. The neutrons forming the neutron flux 208 interact with the target 206 and a backscatter 210 is produced as a result of the interactions. The backscatter 210 may refer to gamma rays formed through inelastic collisions, thermal neutron capture, and the like. It should be appreciated that, in various embodiments, there may be greater amounts of inelastic gamma rays near the start of or during a burst gate, as the high energy neutrons from the neutron generation unit 202 may cause significant inelastic collision, and then as the neutrons thermalize, capture reactions may take place to release the capture gammas.

As particles travel through multiple layers (e.g., thick formations, casing, cement, wellbore fluid, etc.), attenuation may weaken the signals received by the detectors 204. As a result, features of interest may be harder to identify and extract. In certain embodiments, multiple measurements may occur. Furthermore, multiple detectors, different arrays, higher energy sources, and the like may all be deployed to acquire information from the formation. This information may, collectively, be rich in feature data, but hard to parse due to the different sources. Embodiments of the present disclosure may train one or more machine learning systems to evaluate log data and then identify features of interest (e.g., target variables) corresponding to certain response information (e.g., input variables)

Figure 3:
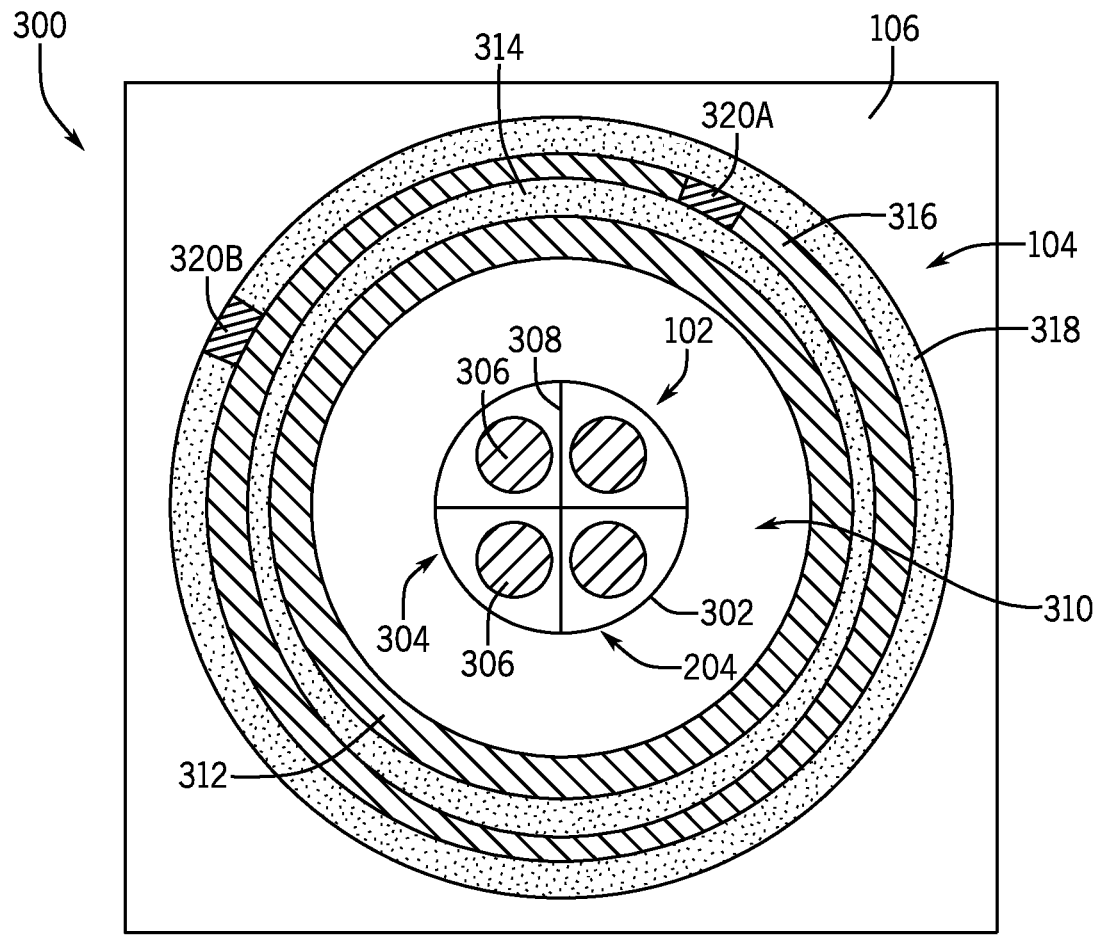
FIG. 3 is cross-sectional top view of an embodiment of a wellbore tool arranged within a wellbore, in accordance with embodiments of the present disclosure.

FIG. 3 is a top cross-sectional view of a measurement environment 300 including the downhole tool 102 arranged within a wellbore 104 that, in this example, is a multi-barrier wellbore that includes a tool body 302 housing the detection unit 204. In this example, the detection unit 204 includes an array 304 of detectors 306, but it should be appreciated that various embodiments may also be utilized with a single detector, less than the four detectors 306 shown in FIG. 3, or more than the four detectors shown in FIG. 3. In this example, a separator 308 is utilized to restrict or substantially block radiation within a particular quadrant of the tool 102, thereby providing azimuthal sensitivity for measurements. It should be appreciated that other embodiments may not include the separator 308. Furthermore, it should be appreciated that other methods may also be deployed to provide azimuthal sensitivity, such as collimators and the like.

The tool body 302 is arranged within an annulus 310 formed within an inner tubular 312 (e.g., inner casing, first tubular, first casing). The illustrated configuration is a multi-barrier wellbore, and as result, cement 314 (e.g., a cement layer, a first cement layer) is arranged between the inner tubular 312 and an outer tubular 316 (e.g., outer casing, second tubular, second casing), which includes another layer of cement 318 (e.g., a cement layer, a second cement layer) and then the formation 106. Further illustrated are defects 320. A first defect 320A is associated with the outer tubular 316 and a second defect 320B is associated with the cement 318. As noted above, it may be challenging for nuclear measurement tools to identify these defects in a multi-barrier well due to attenuation. For example, a radioactive particle will travel through the annulus 310, inner tubular 312, and cement 314 to reach the outer tubular 316, and then back to the detectors 306. Accordingly, signal responses may be weak, thereby increasing a difficulty with detecting the defects 320 at the outer layers. Moreover, it should be appreciated that detection at the inner layers may also be difficult and embodiments of the present disclosure may be incorporated for improved defect detection at any location within the wellbore.

Figure 4:
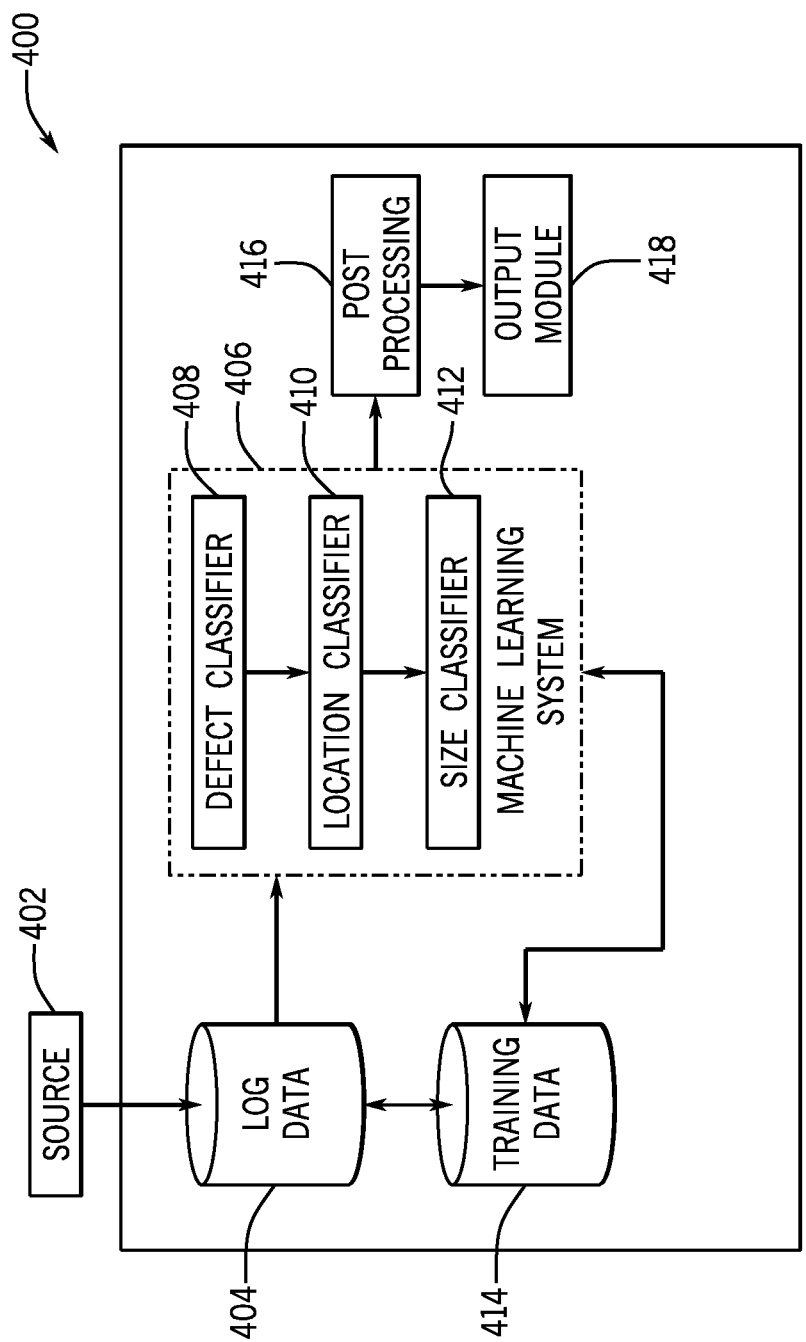
FIG. 4 is a schematic diagram of an embodiment of an environment for processing logging data using a machine learning system, in accordance with embodiments of the present disclosure.

FIG. 4 is a schematic diagram of an environment 400 that may be utilized to process log data using a machine learning system. In this example, source data 402 is provided to a log data store 404. The source data 402 may be acquired from the tool 102, from simulated data generated using one or more computer models, from data associated with previous logs, or the like. The log data may be pre-processed prior to storage in the log data store 404. For example, pre-processing may prepare the data for use with a machine learning system 406. It should be appreciated that pre-processing may also be performed prior to use with the machine learning systems 406 and, in various embodiments, the log data store 404 may store raw data.

The illustrated machine learning system 406 includes a group of classifiers that may be utilized to identify various defects and associated input signals corresponding to those defects. In other words, for a set of inputs, the machine learning system 406 may be utilized to identify target variables that correspond to a defect and/or information about a defect, such as location, size, eccentricity, or the like. The machine learning system 406 may include one or more classifiers, such as perceptron, Naive Bayes, decision trees, logistic regression, K-nearest neighbor, artificial neural networks/deep learning, support vector machines, and/or ensemble methods. An example process using random forest regression will be described below, but it should be appreciated that this is for illustrative purposes only.

The illustrated machine learning system 406 includes separate classifiers, which are illustrated as a defect classifier 408, a location classifier 410, and a size classifier 412. It should be appreciated that there may be more or fewer classifiers, as well as other data structures, but for illustrative purposes the classifiers will be described. The machine learning system 406 is a trained system that utilized training data from a training data store 414. The training data may include previously acquired data logs, simulated data logs, or the like. The training data may include wellbores with known defects and their associated logs. Accordingly, different inputs may be utilized to train the system to identify various defects based on target variables. By way of example only, an increased neutron count rate for a particular detector of an array of detectors may be indicative of eccentricity.

The classifiers 408, 410, 412 may be separately trained models or may be part of the same model. Furthermore, the classifiers 408, 410, 412 may be operable via a distributed computing network. In certain embodiments, the classifiers 408, 410, 412 may be executed by processors stored on the tool, while in other embodiments the classifiers 408, 410, 412 may be executed by processors on uphole or downhole controllers, at distributed data centers, via a distributed computing network, or a combination thereof. It should be appreciated that embodiments of the present disclosure may be performed via execution, by a processor, of written software instructions, stored on a non-transitory machine readable medium. Upon receiving an input from the log data store 404, the classifiers may be utilized to detect whether a defect exists, determine a location for the defect, and determine a size of the defect, among other results. In various embodiments, in order to preserve processing costs, a gate or threshold classification may be utilized. For example, if an initial classification determines that there is no defect, there is no need to process information to determine the location. Accordingly, processing costs may be reduced by using a particular set of rules to provide an ordered process for evaluating the input data. In this manner, computer technology is improved by both utilizing resources more effectively and by selecting certain variables that may be indicative of salient features early in the process to increase speeds for providing results.

In this example, information (e.g., input signals) are transmitted to the machine learning system 406 and may be directed toward the defect classifier 408. The defect classifier 408, upon determining a defect exists, may then feed information about the defect as input to the location classifier 410. Additionally, the log data (e.g., the original input signal) may also be combined with the output of the defect classifier 408 as an input to the location classifier 410. A determined output from the location classifier 410 may then be used as an input to the size classifier 412, which may also be combined with the original input data, the output of the defect classifier 408, and/or the like. In this manner, the defect may be identified, and additional information may also be provided in order to facilitate mitigation operations.

The illustrated environment 400 also includes a post processing module 416 and an output module 418. The post-processing module 416 may clean up the data and/or smooth out information to provide information in a manner that may be read or interpreted by a machine and/or a human. Additionally, the output module 418 may present information related to the output. For example, the output module 418 may present an alert to provide a notification of the defect, may provide potential mitigation information, and the like. It should be appreciated that embodiments of the environment 400 may also be combined with additional processing information. For example, other types of logs may also be used to verify and/or train the machine learning system 406. Additionally, the machine learning system 406 may be one part of a defect detection architecture that is utilized to combine various measurement modalities.

Figure 5:
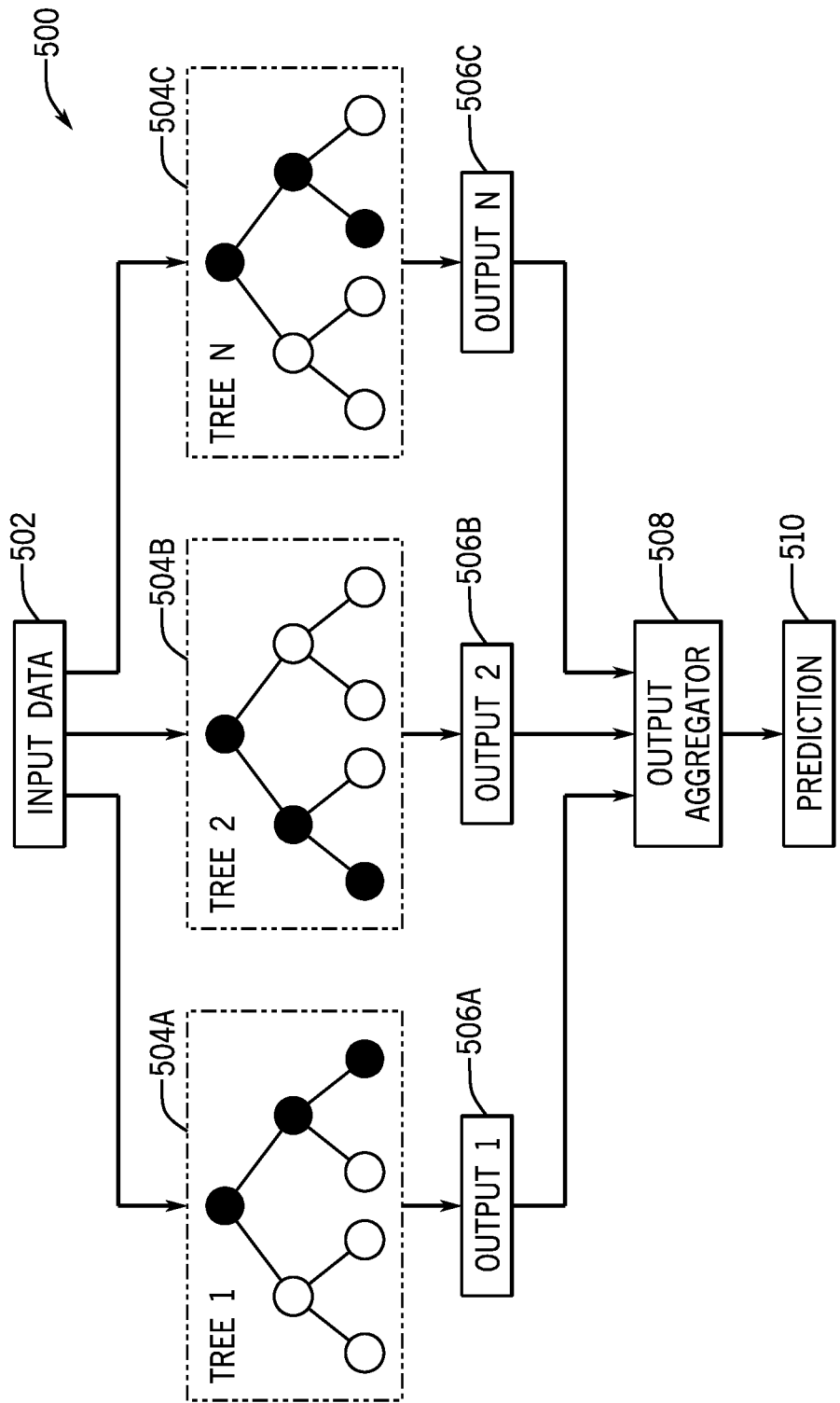
FIG. 5 is a schematic representation of an embodiment of a machine learning system, in accordance with embodiments of the present disclosure.

FIG. 5 is a schematic representation 500 of a classifier, such as the classifiers 408, 410, 412. The illustrated classifier uses a random forest regression algorithm to classify input data. As will be appreciated, a random forest is an ensemble technique capable of performing both regression and classification tasks with the use of multiple decision trees and may utilize bootstrap aggregation to train each decision tree on a different data sample where sampling is done with replacement. Accordingly, outputs rely on combinations of multiple decision trees, rather than relying on individual decision trees. It should be appreciated that feature bagging may also be utilized, where a modified tree learning algorithm selects, at each candidate split in the learning process, a random subset of the features.

Various embodiments of the present disclosure may be a supervised learning model, but it should be appreciated that this may be combined with other machine learning systems that are unsupervised or semi-unsupervised. In operation, input data 502, which may be training data or data processing, is evaluated by a number of trees 504. There may be any number of trees 504, which are represented in FIG. 5 as trees 1-N (e.g., trees 504A-C). During training, multiple decision trees 504 are formed and respective outputs 506 may correspond to a mode of classes (for classifiers) or to mean predictions (for regression). In this example, each of the trees 504 are illustrated as walking through different decision points and then coming to a final prediction, which is transmitted to the respective outputs 506 (e.g., outputs 506A-C). As shown, the random forest of FIG. 5 may be considered a meta-estimator though use of the output aggregator 508 that aggregates the outputs 506 from multiple trees 504 to generate a prediction 510. It should be appreciated that, in certain embodiments, the number of features that can be split on at each node is limited to some percentage of the total to ensure models do not rely too heavily on a specific, individual feature. Furthermore, each tree may draw a random sample from the original data set when generating its splits to prevent overfitting.

Accordingly, embodiments of the present disclosure enable generation of a variety of trees 504 for use with a trained machine learning system. Training data may be utilized to facilitate generation of the splits at the nodes. For example, a certain count rate or response may be indicative of a defect. As a result, the presence of that count rate may be an indicator in making the final prediction. It should be appreciated that while the tree model is shown in FIG. 5, various other machine learning systems may be used with embodiments of the present disclosure.

Figure 6:
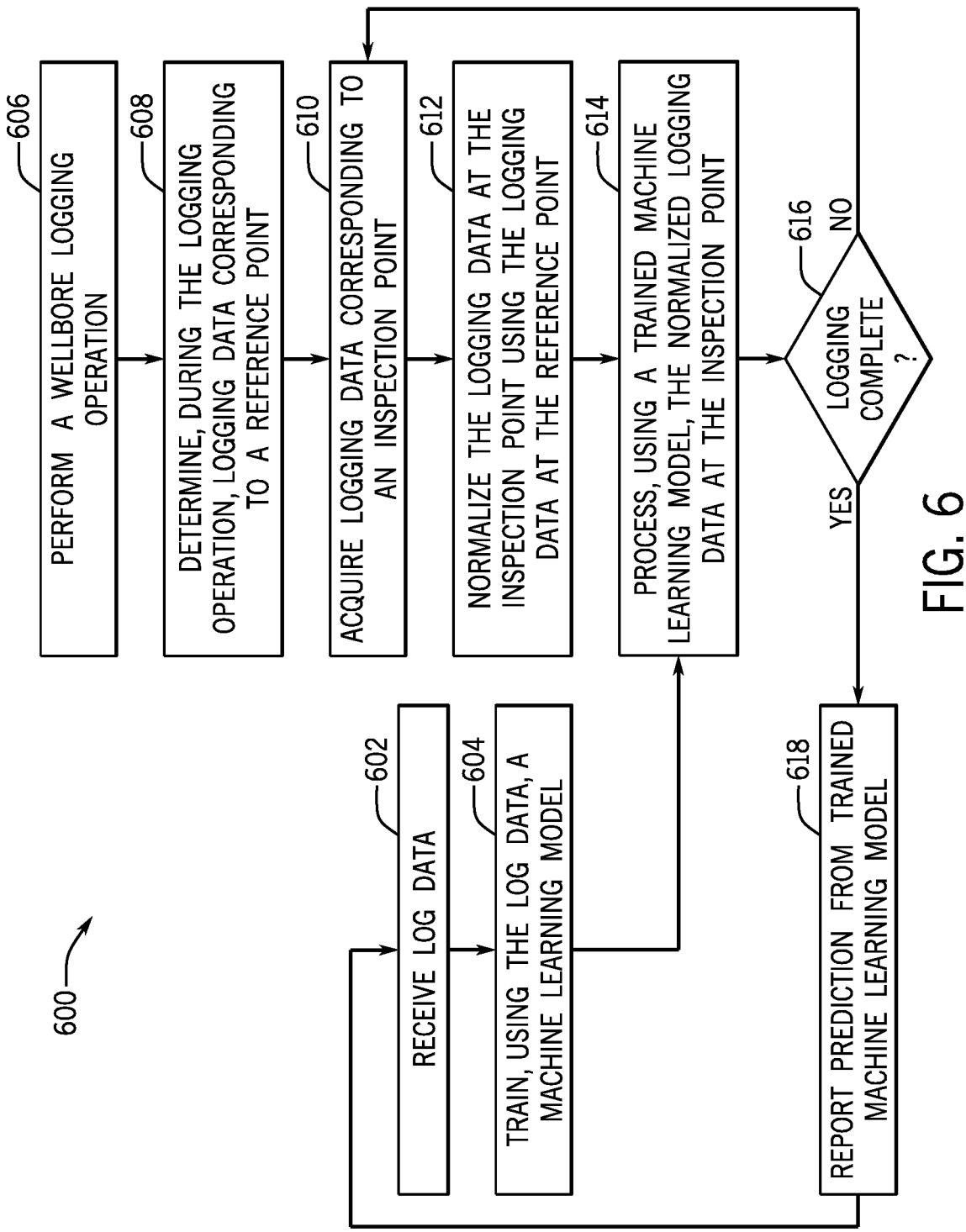
FIG. 6 is a flow chart of an embodiment of a method for identifying a defect using a machine learning system, in accordance with embodiments of the present disclosure.

FIG. 6 is a flow chart of an embodiment of a method 600 for identifying defects or tubing eccentricity using a trained machine learning system. It should be appreciated that for this method, and any other method described herein, that there may be more or fewer steps. Furthermore, the steps may be performed in parallel or in a different order, unless otherwise specifically stated. In this example, log data is received 602 and utilized to train a machine learning model 604. As described above, the log data may be pre-processed data and may include log data from previous logging operations, simulated data, and the like. The log data may be used as training data for a machine learning system, such as a random forest regression algorithm, computational neural network, or the like.

The method continues with performing a wellbore logging operation 606. The operation may include a variety of different measurement modalities, such as a nuclear logging operation. A reference point is determined during the logging operation and/or after evaluating data from the logging operation 608. For example, the reference point may correspond to a depth of the wellbore without defects, such as known defect-less cement or concentric tubing. This information, as noted below, may be used to normalize other data. Logging data is acquired corresponding to an inspection point 610. The inspection point may be any depth of the wellbore. The data associated with the inspection point may be normalized using the data from the reference point 612 and then processed using the trained machine learning system 614. For example, the normalized data may be an input to a machine learning system that includes one or more classifiers to identify defects within the wellbore.

A determination is made whether logging is complete 616. It should be appreciated that this determination, as well as one or more steps of the process, may be made during a logging operation or after a logging operation is complete. For example, processing may be performed in real or near-real time (e.g., without significant delay). Additionally, logs may be collected and processed at a later time. If logging is complete and/or there is no further data to evaluate, then a report is generated based on information from the model 618. For example, the report may provide information related to the defect, such as its depth, size, azimuthal location, and the like. Accordingly, information may be acquired and processed using a trained machine learning system. Moreover, the reports from the system may also be used as training data for other machine learning systems or to update existing machine learning systems.

Figure 7:
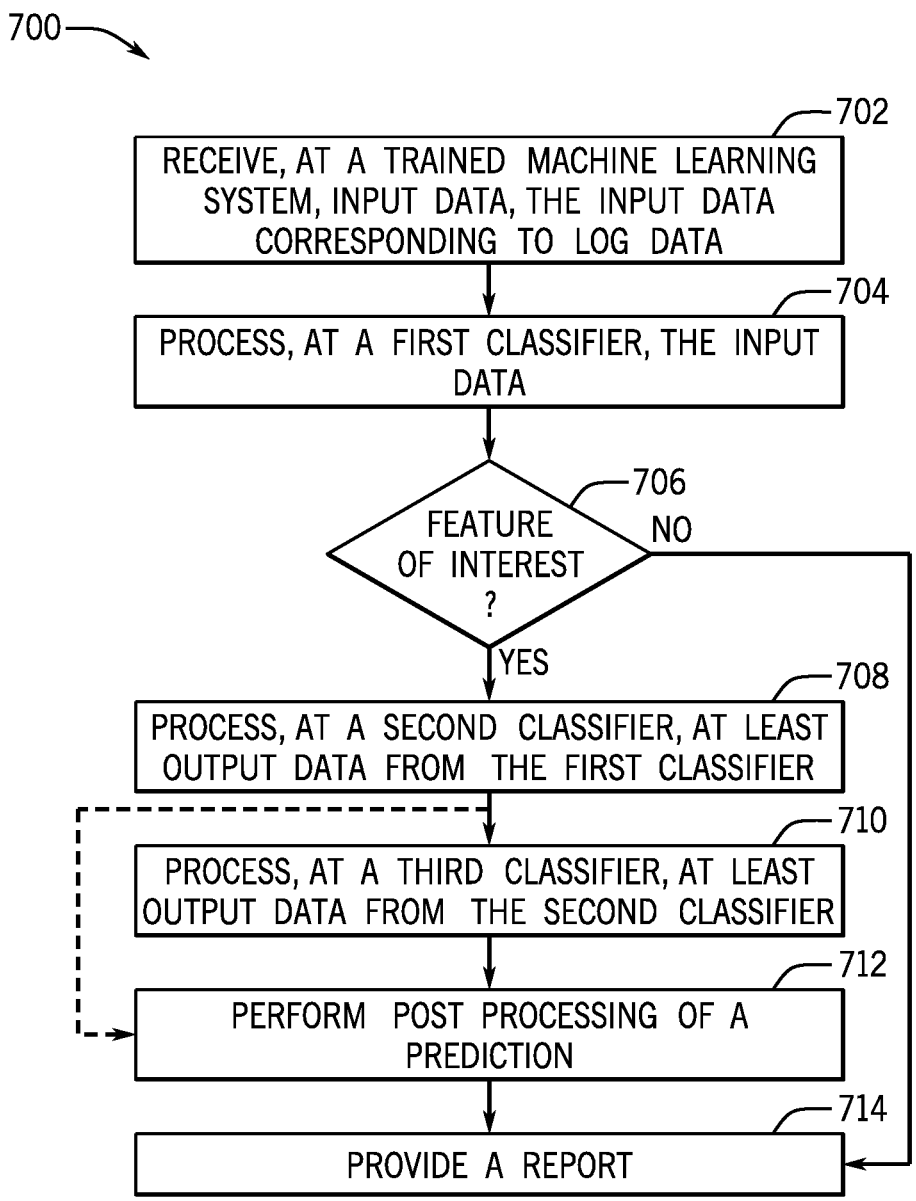
FIG. 7 is a flow chart of an embodiment of a method for identifying a defect using a machine learning system, in accordance with embodiments of the present disclosure.

FIG. 7 is a flow chart of an embodiment of a method 700 for classifying information using a machine learning system. In this example, input data is provided at a trained machine learning system 702. The input data may correspond to log data, such as wellbore logs from a nuclear logging operation, however it should be appreciated that other logging operations or downhole inspection information may be used. A first classifier processes the input data 704. The first classifier may serve as a threshold or gate for continued processing, by making a determination as to whether a feature of interest is present 706. If there is a feature of interest, the process continues to a second classifier, which uses at least output from the first classifier as an input 708. It should be appreciated that the entirety of the input data, or selected portions of the input data, may also be utilized. The second classifier may be trained to determine a different feature or variable when compared to the first classifier. For example, as noted above, the first classifier may be a threshold classifier to determine whether a defect exists, while the second classifier may evaluate a size of the defect. Output data from the second classifier is then processed by a third classifier 710. It should be appreciated that the entirety of the input data, or selected portions of the input data, may also be utilized. The third classifier may be trained to determine a different feature or variable when compared to the first classifier and the second classifier. For example, as noted above, the first classifier may be a threshold classifier to determine whether a defect exists, the second classifier may evaluate a size of the defect, and the third classifier may determine a location of the defect.

Various embodiments also include post processing of the output data 712. Post processing may include processing one or both of the second classifier output or the third classifier output. Thereafter, a report may be generated 714. The report may correspond to defects located within the logging data along with additional information about the defect. As noted above, if an initial defect is not identified, subsequent processing using the second and third classifiers may be skipped and the report may be generated, thereby saving computing resources.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A method for detecting a wellbore defect, comprising:
receiving, at a trained machine learning system, input data, the input data corresponding to log data acquired from a radiation detector in a nuclear logging tool for a wellbore operation in a multi-barrier wellbore;
processing, using a first classifier of the machine learning system, the input data;
identifying, using the first classifier of the machine learning system, a feature of interest associated with the input data;
receiving, at a second classifier of the machine learning system, first output data from the first classifier and the input data, the first output data corresponding to a defect associated with the wellbore;
receiving, at a third classifier of the machine learning system, second output data from the second classifier and the input data, the second output data corresponding to a first property of the defect; and
providing a report corresponding to the defect, the first property of the defect, and a second property of the defect corresponding to third output data from the third classifier.

2. The method of claim 1, further comprising:
pre-processing the input data before the data is received at the trained machine learning system, the pre-processing including at least one of data filtering or data normalization.

3. The method of claim 1, further comprising:
training the machine learning system using training data, the training data including at least one of previous well log data or simulated well log data.

4. The method of claim 1, further comprising:
receiving, at a post processing module, the second output data and the third output data, the post processing module extracting salient information from the second output data and the third output data; and
receiving, at an output module, the salient information from the second output data and the third output data, the output module compiling the report.

5. The method of claim 1, wherein the defect corresponds to at least one of a tubing defect, a casing defect, a cement defect, or a tubing eccentricity.

6. The method of claim 1, wherein the first property of the defect corresponds to at least one of a location of the defect or a size of the defect.

7. The method of claim 1, wherein the machine learning system includes at least one of a random forest regression algorithm, a convolutional neural network, or a recurrent neural network.

8. The method of claim 1, further comprising:
determining, based on the defect classifier, that at least the portion of wellbore data does not include a defect; and
stopping processing, using the machine learning model.

9. A method for identifying defects, comprising:
receiving log data acquired from a radiation detector in a nuclear logging tool, the log data corresponding to one or more wellbore operations using the nuclear logging tool, the log data including data from at least one measurement modality corresponding to a present measurement modality;
training, using the log data, a machine learning model;
acquiring wellbore data, via the present measurement modality, during a logging operation;
processing at least a portion of the wellbore data using the trained machine learning model, the trained machine learning model including a defect classifier, a location classifier, and a size classifier, wherein the portion of the wellbore data is sequentially processed by the defect classifier, the location classifier, and the size classifier, and defect output data from the defect classifier is provided to the location classifier and location output data is provided to the size classifier; and
identifying one or more features of interest in the wellbore data, via the trained machine learning model.

10. The method of claim 9, further comprising:
identifying a reference point within the wellbore data, the reference point corresponding to a first depth and to a location without a defect; and
prior to processing at least the portion of the wellbore data, normalizing at least the portion of the wellbore data, based at least in part on the reference point.

11. The method of claim 9, wherein the processing is performed during the logging operation.

12. The method of claim 9, further comprising:
providing a report, based at least in part on the one or more features of interest, the report identifying one or more defects associated with a multi-barrier wellbore.

13. The method of claim 12, wherein the one or more defects correspond to at least one of a tubing defect, a casing defect, a cement defect, or a tubing eccentricity.

14. The method of claim 9, wherein the machine learning model includes at least one of a random forest regression algorithm, a convolutional neural network, or a recurrent neural network.

15. The method of claim 9, wherein the machine learning model includes at least one classifier to determine tubing eccentricity.

16. The method of claim 9, wherein both the defect output data and at least the portion of the wellbore data are processed by the location classifier and both the location output data and at least the portion of the wellbore data are processed by the size classifier.

17. A method for identifying defects in a wellbore, comprising:
receiving log data, the log data corresponding to one or more wellbore operations;
training, using the log data, a machine learning model;
acquiring wellbore data, during a logging operation using a logging tool with one or more radiation generators and one or more radiation detectors, the one or more radiation detectors positioned to obtain signals from a surrounding formation that includes a multi-string casing;
normalizing at least a portion of the wellbore data, the normalized portion of the wellbore data corresponding to a location of interest;
processing the normalized portion of wellbore data using the trained machine learning model;

determining, via a first classifier of the machine learning model, whether a feature of interest is present in the normalized portion of the wellbore data;

upon determining the feature of interest is not present, ending processing of the normalized portion of the wellbore data; and upon determining the feature of interest is present, determining one or more properties of the feature of interest using at least one additional classifier, the at least one additional classifier processing, as an input, at least a portion of the normalized data and an output from the first classifier.

18. The method of claim 17, wherein the at least one additional classifier corresponds to at least one of a location classifier or a size classifier.

19. The method of claim 17, wherein the feature of interest corresponds to at least one of a tubing defect, a casing defect, a cement defect, or a tubing eccentricity.

20. The method of claim 17, wherein the machine learning model includes at least one of a random forest regression algorithm, a convolutional neural network, or a recurrent neural network.

\* \* \* \* \*